Dec. 25, 1945.   H. P. RANDALL   2,391,513
LOCK NUT
Filed Aug. 7, 1943
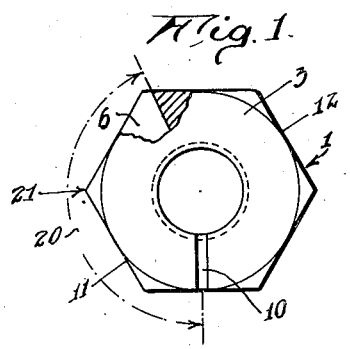
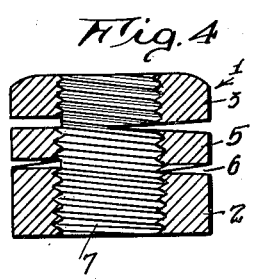
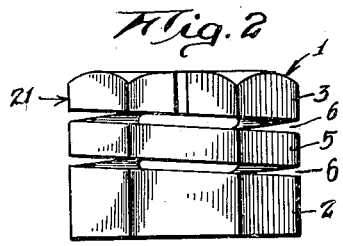
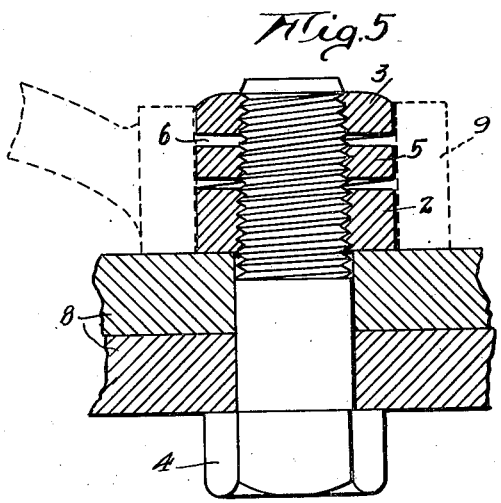
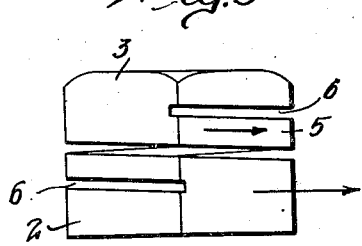
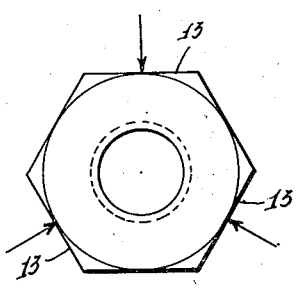
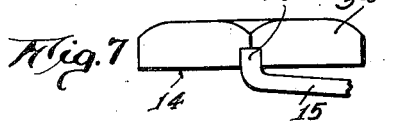
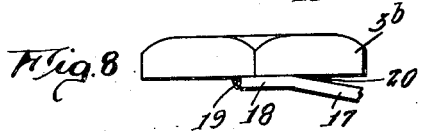
Inventor
Herman P. Randall
By Lyon & Lyon
Attorneys Patented Dec. 25, 1945

2,391,513

UNITED STATES PATENT OFFICE 2,391,513

LOCK NUT

Herman P. Randall, Pasadena, Calif.

Application August 7, 1943, Serial No. 497,816

5 Claims. (Cl. 151—21)

This invention relates to a lock-nut and an object of the invention is to produce a lock-nut which will not work loose from vibration.

Another object of the invention is to produce a lock-nut which when used is composed of one piece so that on applying it to a bolt it is not necessary to apply two or more separate parts.

Another object of the invention is to produce a lock-nut in quantities economically and without the use of special tools.

In assembling machine parts in modern machine shops it is necessary frequently, after the parts have been bolted up, to unbolt them again and this necessitates putting on and taking off the nuts and bolts. One of the objects of this invention is to produce a lock-nut with which this can be accomplished without detracting from the wearing quality of the nut and its quality of being unaffected by vibration.

Invention also resides in the method of making the nut.

Further objects of the invention will appear hereinafter.

The invention consists in the novel parts and combinations of parts to be described hereinafter, all of which contribute to produce an efficient lock-nut.

A preferred embodiment of the invention is described in the following specifications, while the broad scope of the invention is pointed out in the appended claims.

In the drawing:

Fig. 1 is a plan view of a lock-nut embodying my invention, a portion of the nut being broken away and shown partly in section.

Fig. 2 is a side elevation of the nut illustrated in Fig. 1.

Fig. 3 is a side elevation of the nut illustrated in Figs. 1 and 2, but showing the nut with a corner presented to the observer.

Fig. 4 is a vertical section through the nut embodying my invention and showing the same removed from the bolt.

Fig. 5 is a view similar to Fig. 4; that is to say, it shows the nut in section, but this view shows the nut on the bolt and represents the bolt clamping the plates together.

Fig. 6 is a plan view of the nut, illustrating a method that may be employed involving the use of lateral pressure, in making the nut.

Fig. 7 is a side elevation broken away, illustrating the upper portion of a nut embodying my invention, but this view illustrates a modified embodiment of the invention.

Fig. 8 is a view similar to Fig. 7, illustrating a modified embodiment of the invention.

In practicing the invention, I construct a nut 1 (see Figs. 1 to 5) so that it presents an inner head 2 and an outer head 3, both of which are threaded internally so as to enable the nut to be applied to a bolt 4, as illustrated in Fig. 5.

Between these two heads 2 and 3 I provide a connecting portion or waist 5, which is in the form of a helix, the upper end of which is secured to or integral with the outer head 3 and the lower end of which is secured to or integral with the inner head 2. As illustrated in Figs. 1 to 5 this connecting portion 5 is formed integral with the inner and outer heads of the nut and when the nut is formed in this way it is produced by cutting a helical slot 6 in the nut which extends into its outer wall into the threaded bore or opening 7 in the nut. The helical cut 6 is formed in the nut after the thread has been cut in its bore or opening 7 and in constructing the nut I construct it in such a way that the outer head 3 is somewhat tight on the threads of the bolt that it is on. The helical portion or waist 5 is of course also threaded as it will become threaded when the threading tap is run through the nut before the helical slot 6 has been cut.

The direction of the helix of the helical section 5 is opposite in character to that of the threads of the nut and bolt. In other words, if the nut has right-handed threads the helix would be a left-hand helix.

When this nut is applied to a bolt it should be maintained in a neutral condition. That is to say without the helical portion 5 being under any strain or stress. Hence it is preferable to apply the nut to bolted-up plates 8 in such a situation (see Fig. 5) by means of a socket wrench, the socket of which is indicated in dotted lines 9 in this figure. As all parts of the nut are held in angles of the socket, there can be no relative rotation of one part of the nut with respect to any other part when the nut is being applied. As the inner head or base 2 of the nut becomes seated the outer head 3 becomes slightly tight on the thread of the bolt, sufficiently tight to insure that it will offer some resistance to rotation by the inner base 2 if it should tend to rotate or "work" backwards, due to vibration. In a nut with a right-hand thread, such as illustrated, it will be evident that in order for the base 2 of the nut to unscrew it would have to move in the direction of the arrow shown in Fig. 3. This direction of movement of the base 2 would develop a tensile force in the direction of the upper arrow in the helix 5 and the movement of this helix would be resisted by the relatively tight outer head 3 of the nut. This resistance develops what is known as a servo-action in the helix 5. That is to say it develops a wrapping of the helix on the bolt, and by reason of this servo-action a very considerable radial pressure is exerted by the helix against the side of the bolt, much greater than the pressure then existing between the threads of the bolt and the nut at the head 3.

It is obvious that the invention could be practiced without having the opening through the waist of the nut threaded, but this would be unadvantageous because the wrapping of the waist onto this thread might tend to burr the thread of the bolt. It is much more preferable to have the waist threaded so that the opening through it has threads to fit on the threads of the bolt.

Any desired method may be employed for insuring that the outer head 3 of the nut will grip the threads of the bolt so that it will offer sufficient resistance to rotation to develop the servo-action of the helix 5. In order to accomplish this I may provide the upper face of the head 3 with a radial slot 10 (see Figs. 1 and 2) which slot extends from the end of this head down until it communicates with the slot 6 and furthermore this slot 10 preferably extends all the way from the periphery into the threaded bore. This slot can be formed in the outer head 3 either before or after the opening through the entire nut is tapped. In the first case, when the tap passes through the nut a slight expansion will take place as the tapered portion of the tap passes into the slotted head 3 so that the thread in this portion of the nut will be incompletely cut and this expansion will take place even if the tap is advanced until its full diameter passes through to the upper face of the head 3. In case the slot 10 is formed in the head 3 after it has been tapped, it is found in practice that there is a tendency for the nut head 3 to contract and this will afford sufficient resistance to rotation to enable the nut to operate as described; that is with the servo-action or if desired the nut head 3 can be squeezed by pressure on two diametrically opposite faces, such as the faces 11 and 12, so as to contract the nut head slightly.

However, in Fig. 6 I illustrate another method of insuring sufficient resistance to rotation of the head 3, and in this case I do not form any slot but merely apply considerable pressure on three equally spaced side faces 13 of the nut head. These radial inward acting forces, acting as indicated by the arrows in this figure, would produce a slight inward distortion of the nut head slightly decreasing the radius of the nut threads on these radial lines, and this, of course, would cause the nut head to bind and develop the requisite resistance.

I prefer to have the helix or waist 5 extend through about 360°. That is to say if I start the lower end of the helix on a certain angle of the nuts the upper end of the helix would terminate on the same angle just above the starting point.

Instead of making the nut as described above, the invention can be practiced if desired by connecting two nut heads by a separate piece. The connecting part is constructed so as to operate with a servo-action. In Figs. 7 and 8 I illustrate two types of nuts manufactured in that way. This servo-connector is here illustrated as a helix. In Fig. 7 the inner face 14 of the nut head 3a can be provided with a radial slot and the upper end of the helix 15 would be provided with a laterally bent tongue 16 that would make a press-fit into this slot. The lower end of the helix would be attached to the lower head of the nut in the same way.

In Fig. 8 I illustrate another way of forming this nut in which I would employ a helix 17 which can be punched out from the sheet metal and extended into a helix, the upper end of the helix having a straight foot 18 with no pitch, which could be secured by means of welds 19 and 20 to the underside of the upper head 3b of the nut, or this foot or tongue 18 could be spot-welded to the underside of the nut head if desired.

The dies for making spring washers could be readily adapted for punching out helices, such as the helix 17. Of course when the nut is made in the manner indicated in Figs. 7 and 8, the helices would be threaded after the nut is completed. That is to say, the nut would be threaded like an ordinary nut, so that they would be threaded at the same time as the openings in the inner and outer heads of the nut.

The preferred form is that shown in Figs. 1 to 5 in which the outer head has the slot 10, to insure that the outer head will elastically grip the bolt, although this elastic grip can be insured by other means than the slot 10.

In the preferred form, a portion 21 of the outer head extends through an arc 20, as shown in Fig. 1. One end of this portion 21 is solidly connected to the main body of the nut, the other end adjacent to the slot 10 being free. If the nut is threaded according to standard practice with the slot in the end of the portion 21, this portion 21 tends to spring outwardly radially to the axis of the bolt 4 and it will be found upon withdrawing the tap that the threaded hole in the outer head is slightly smaller in diameter than the hole in the inner head. This insures that the outer head tends to elastically grip the bolt and this tendency can be increased if inward pressure is applied to portion 21 of the nut before it is put on the bolt to deform its free end inwardly. If the hole in the outer head wears slightly, the elastic grip may be restored by such deformation.

My basic conception consists in the use of an inner head which takes the axial outward thrust, an outer head which grips the bolt to resist rotation of the head, and a helical servo-connection between the heads which is preferably threaded to the bolt and which is pulled radially inward if the inner head turns in a "back off" direction, which would back the nut off the bolt. The rotation of the lower end of the helix in a backoff direction tightens the helix on the threads both radially and on the sides of the thread, greatly increasing the frictional grip of the helix on the nut so that only a very slight backoff turning tendency is transmitted to the outer head. It is quite practical to provide enough gripping force in the outer head to resist any turning movement transmitted to it by the helix.

Many other embodiments of this invention may be resorted to without departing from the spirit of the invention.

What I claim is:

1. A nut including a threaded nut member to be screwed onto the threads of a bolt, and a servo-acting part anchored at one end to said nut member and extending around the bolt; and means for anchoring the servo-acting part to the bolt; said servo-acting part operating to wrap itself against the bolt threads when rotation of the said nut member is initiated in a direction to unscrew the nut from the bolt, and thereby resist further rotation of the said nut member.

2. A lock-nut comprising an outer head, and an inner head adapted to seat against the part to be held by the nut, and a circumferentially disposed servo-acting part, one end of said servo-acting part having a laterally extending tongue, and the adjacent face of the outer head having a socket receiving the said tongue for securing the said parts together; the other end of the said servo-acting part having a lateral tongue projecting toward the other head, and said other head having a socket in its face receiving the last named tongue for securing the servo-acting part to that head, the said nut having threads extending through the said heads and through the said servo-acting part of a diameter larger than the diameter of the bolt that is to receive the nut, the forward end of the servo-acting part with respect to the direction of rotation of the nut in applying the same to the bolt, being secured to the inner head, said outer head being sufficiently tight on the bolt so that the rotation of the inner head in a direction to unscrew the nut exerts a circumferential tensile force in the servo-acting part tending to rotate the outer head, and resisted by the tightness of the outer head, whereby the said tensile force operates to wrap the servo-acting part on the thread of the bolt and lock the nut to the bolt.

3. In a lock-nut, the combination of a bolt having an external thread, a nut having an outer head, and an inner head adapted to seat against the part to be held by the nut, and a circumferentially disposed servo-acting part, one end of said servo-acting part having a laterally extending tongue, and the adjacent face of the outer head having a socket receiving the said tongue for securing the said parts together; the other end of the said servo-acting part having a lateral tongue projecting toward the other head, and said other head having a socket in its face receiving the last named tongue for securing the servo-acting part to that head, the said nut having threads extending through the said heads and through the said servo-acting part of a diameter larger than the diameter of the bolt that is to receive the nut, the forward end of the servo-acting part, with respect to the direction of rotation of the nut in applying the same to the bolt, being secured to the inner head, said outer head being sufficiently tight on the bolt so that the rotation of the inner head in a direction to unscrew the nut exerts a circumferential tensile force in the servo-acting part tending to rotate the outer head, and resisted by the tightness of the outer head, whereby the said tensile force operates to wrap the servo-acting part on the thread of the bolt and lock the nut to the bolt.

4. A lock-nut having a threaded opening enabling the same to be screwed onto a threaded bolt, and including an inner head and an outer head, said outer head having a substantially radial slot extending through the same, adapting the outer head to be compressed to reduce the size of the opening in the outer head so as to enable the same to be relatively tight on the bolt, said nut including a servo-section connecting the said heads, consisting of an element the material of which is disposed in a helix with the inner edge of the helix in a position to engage the thread of the bolt, and operating under the action of tension in the same, to wrap on the threads of the bolt when a rotation of the inner head is initiated on the bolt in a direction to unscrew the nut.

5. A lock-nut having threads enabling the same to be screwed onto a threaded bolt, said nut including an inner head and an outer head, with a servo-section connecting the said heads, said servo-section consisting of an element the material of which is disposed in a helix with the inner edge of the helix in a position to engage the thread of the bolt, and operating under the action of tension in the same, to wrap on the threads of the bolt when a rotation of the inner head is initiated on the bolt in a direction to unscrew the nut, said outer head having its opening for the bolt slightly out of true, so as to enable the outer nut head to develop considerable resistance to rotation on the bolt.

HERMAN P. RANDALL.